(12) United States Patent
Wade et al.

(10) Patent No.: US 10,441,111 B2
(45) Date of Patent: Oct. 15, 2019

(54) GRINDER DEVICE

(71) Applicant: ACH Food Companies, Inc., Cordova, TN (US)

(72) Inventors: Allan E. Wade, Ankeny, IA (US);
Aaron F. Fitchko, Huxley, IA (US);
Chun Man Chen, Tokwawan (HK);
Alex Liu, Portland, OR (US)

(73) Assignee: B&G FOODS NORTH AMERICA, INC., Parsippany, NJ (US)

( * ) Notice: Subject to any disclaimer, the term of this patent is extended or adjusted under 35 U.S.C. 154(b) by 1170 days.

(21) Appl. No.: 14/595,519

(22) Filed: Jan. 13, 2015

(65) Prior Publication Data

US 2015/0122925 A1 May 7, 2015

Related U.S. Application Data

(62) Division of application No. 13/613,984, filed on Sep. 13, 2012, now Pat. No. 9,125,525.

(51) Int. Cl.
*A47J 42/18* (2006.01)
*A47J 42/02* (2006.01)
*A47J 42/14* (2006.01)
*A47J 42/34* (2006.01)
*A47J 42/00* (2006.01)
*A47J 42/08* (2006.01)

(52) U.S. Cl.
CPC .............. *A47J 42/18* (2013.01); *A47J 42/02* (2013.01); *A47J 42/14* (2013.01); *A47J 42/00* (2013.01); *A47J 42/08* (2013.01); *A47J 42/34* (2013.01)

(58) Field of Classification Search
CPC .. A47J 42/18; A47J 42/14; A47J 42/02; A47J 42/00; A47J 42/08; A47J 42/34; A47J 43/25
USPC ...................................... 241/168, 169.1, 258
See application file for complete search history.

(56) References Cited

U.S. PATENT DOCUMENTS

| | | |
|---|---|---|
| 286,384 A | 10/1883 | Caine |
| 824,058 A | 6/1906 | Bain |
| 899,716 A | 9/1908 | Dinsmore |
| 1,588,552 A | 6/1926 | Sprinkle |
| 1,773,720 A | 8/1930 | Alland |
| 2,184,719 A | 12/1939 | Mantelet |

(Continued)

OTHER PUBLICATIONS

Canadian Office Action dated Sep. 23, 2015 for Application No. CA 2,826,454, 6 pgs.

*Primary Examiner* — Anthony D Stashick
*Assistant Examiner* — Onekki P Jolly
(74) *Attorney, Agent, or Firm* — K&L Gates LLP

(57) ABSTRACT

An apparatus for grinding a mineral includes a head operable to be attached to a bottle. The head includes a radial slider for controlling the coarseness of the grind. The apparatus further includes an inner grinding element, an outer grinding element, a shaft, and a neck sleeve. The inner grinding element is in communication with the head. The outer grinding element is also in communication with the head, wherein the outer grinding element and the inner grinding element are operable to rotate relative to each other. The shaft extends through the inner grinding element and the outer grinding element. The shaft couples with the inner grinding element and comprises a blunt end. The shaft also extends through the neck sleeve, which acts as a spacer between the inner grinding element and the blunt end.

13 Claims, 15 Drawing Sheets

(56) References Cited

U.S. PATENT DOCUMENTS

| | | |
|---|---|---|
| 2,222,927 A | 11/1940 | Mantelet |
| 2,280,211 A | 4/1942 | Bernhardt |
| 2,795,382 A | 6/1957 | Francesch |
| 3,168,256 A | 2/1965 | Bounds et al. |
| 3,533,195 A | 10/1970 | Schumann et al. |
| 3,827,641 A | 8/1974 | Andersson |
| 4,697,749 A | 10/1987 | Holcomb et al. |
| 4,949,879 A | 8/1990 | Mariotti |
| 5,176,329 A | 1/1993 | De Coster et al. |
| D382,167 S | 8/1997 | Husted |
| 6,196,481 B1 | 3/2001 | Barbagli |
| D447,920 S | 9/2001 | Lillelund et al. |
| 6,517,018 B2 | 2/2003 | Manson |
| 6,568,616 B1 | 5/2003 | Tang |
| 6,655,616 B1 | 12/2003 | Wagner |
| 6,830,205 B2 | 12/2004 | Wang |
| 6,877,684 B2 | 4/2005 | Wu |
| 6,929,201 B1 * | 8/2005 | Blouse .................. A47J 42/04 241/168 |
| 6,948,672 B2 | 9/2005 | Herren |
| 7,066,418 B2 | 6/2006 | Ng |
| 7,077,347 B1 | 7/2006 | Wang |
| 7,207,511 B2 | 4/2007 | Ng |
| D580,702 S | 11/2008 | Holcomb et al. |
| 7,543,771 B2 * | 6/2009 | Wang Wu .............. A47J 42/04 241/168 |
| 7,806,354 B2 * | 10/2010 | de Groote ............. A47J 42/40 241/169.1 |
| 7,878,437 B2 | 2/2011 | Rice |
| 7,967,229 B2 | 6/2011 | Wilson et al. |
| 8,083,167 B1 * | 12/2011 | Namakian .............. A47J 42/24 241/169.1 |
| 9,125,525 B2 | 9/2015 | Wade et al. |
| 2004/0195412 A1 * | 10/2004 | Yang ..................... A47J 42/48 241/169.1 |
| 2005/0211806 A1 * | 9/2005 | Ng ......................... A47J 42/06 241/169.1 |
| 2006/0060686 A1 | 3/2006 | Cheng |
| 2008/0315021 A1 * | 12/2008 | Tang ..................... A47J 42/04 241/169.1 |
| 2009/0134256 A1 * | 5/2009 | Rice ...................... A47J 42/04 241/169.1 |
| 2012/0199679 A1 * | 8/2012 | Wilson .................. A47J 42/08 241/169.1 |

\* cited by examiner

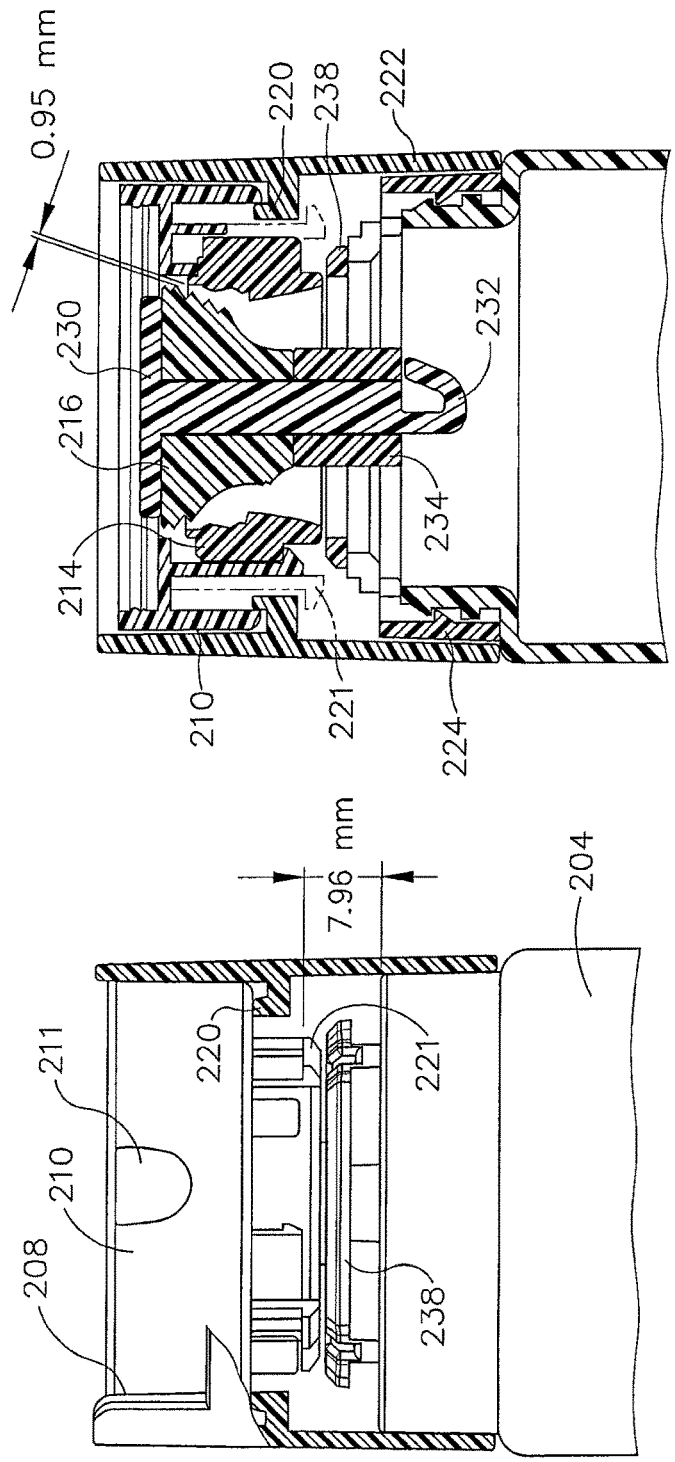

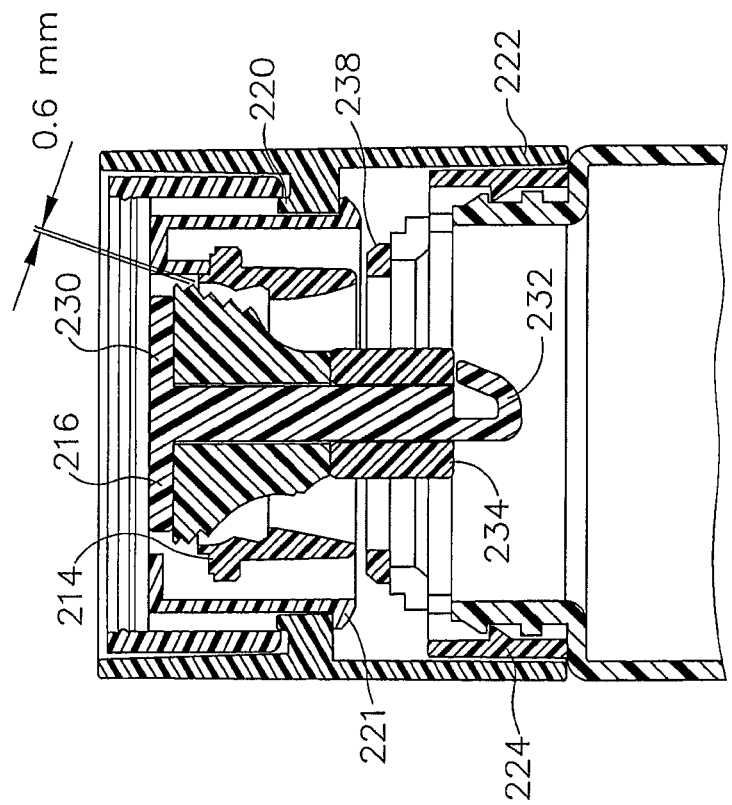
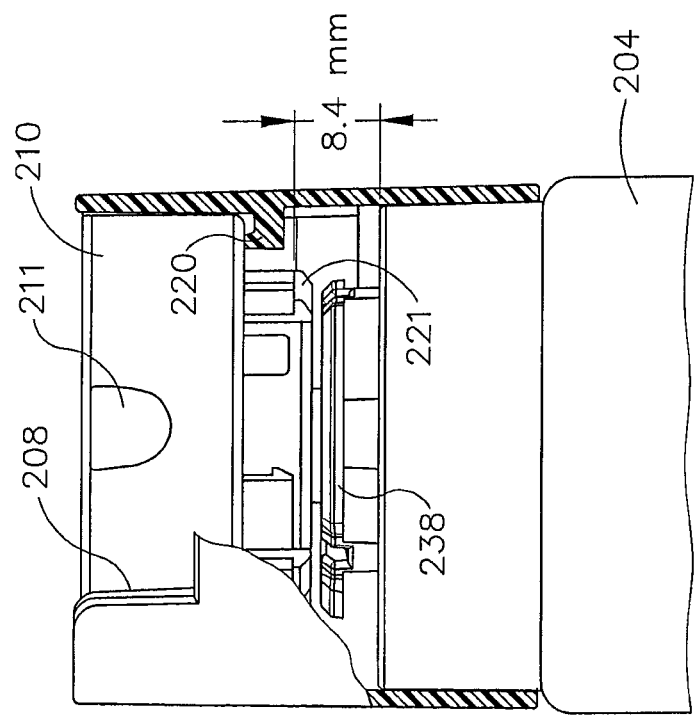
Fig.6B
Fig.6A

GRINDER DEVICE

PRIORITY

This application is a divisional of U.S. patent application Ser. No. 13/613,984, entitled "Grinder Device," filed Sep. 13, 2012, the disclosure of which is incorporated by reference herein.

BACKGROUND

In the context of cooking and other areas regarding food preparation, it will be appreciated that spices and/or minerals may be used, such as salt or pepper. Depending on the situation or the dish being prepared, it will be appreciated that different amounts or grain sizes of spices or minerals may be desired. Furthermore, in many cases, salt may be sold in the form of larger crystals and pepper may be sold in the form of peppercorns. In order for larger spices and minerals to be used, they must be ground prior to using them in cooking.

While a variety of grinders have been made and used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which:

FIG. 5A depicts a side elevation view of a head of the grinder of FIG. 4 in a coarse grind setting;

FIG. 5B depicts a side partially cross sectional view of the head shown in FIG. 5A;

FIG. 6A depicts a side elevation view of the head of the grinder of FIG. 4 in a medium grind setting;

FIG. 6B depicts a side partially cross sectional view of the head shown in FIG. 6A;

Figure 1:
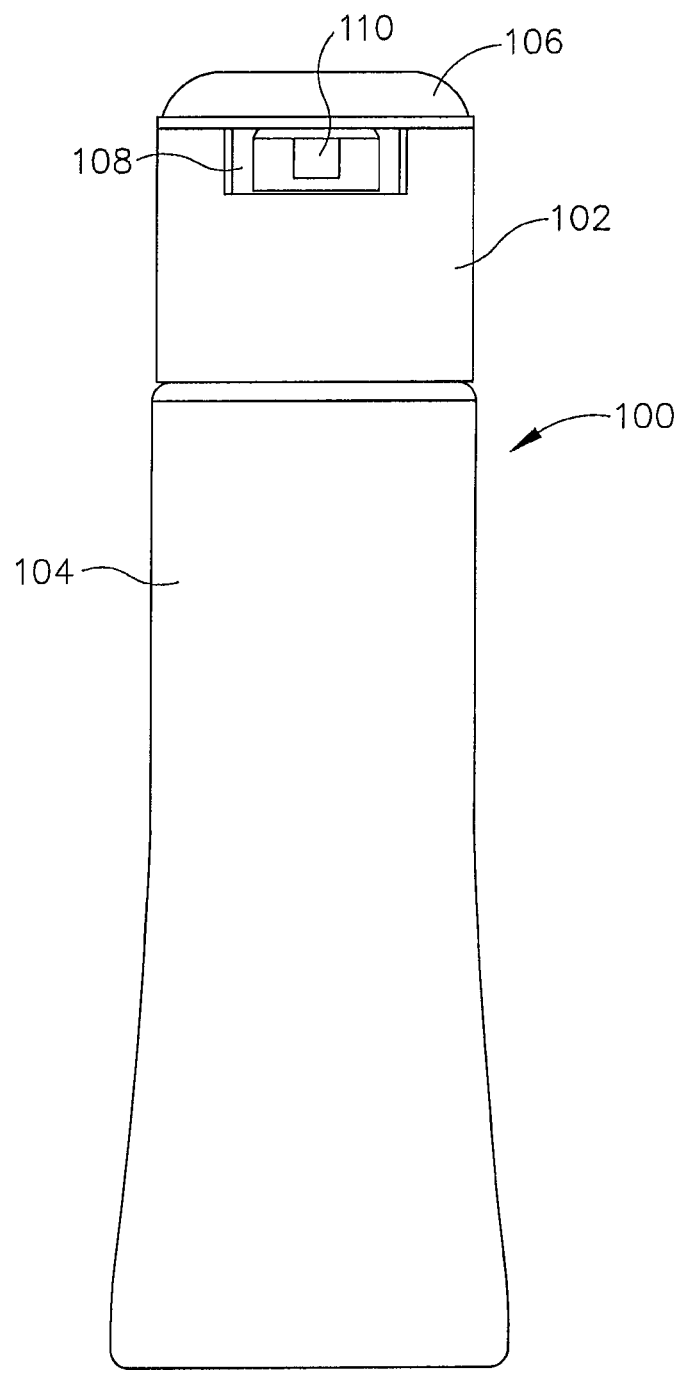
FIG. 1 depicts a front elevation view of an exemplary grinder.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Grinder

Figure 2:
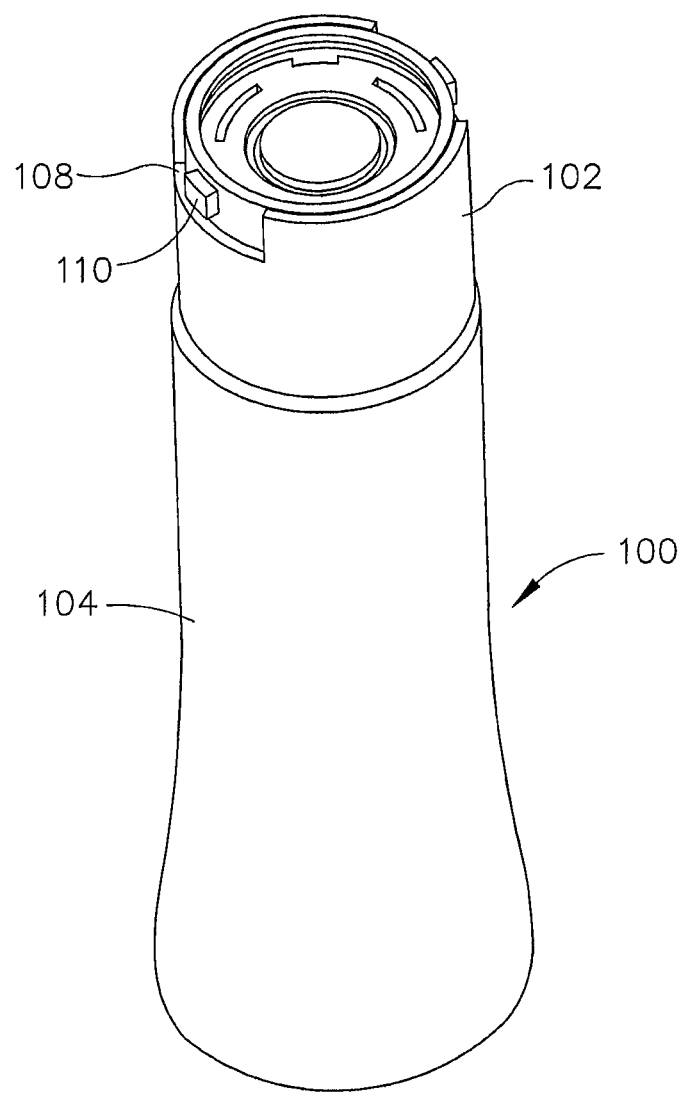
FIG. 2 depicts a side perspective view of the grinder of FIG. 1.
Figure 3:
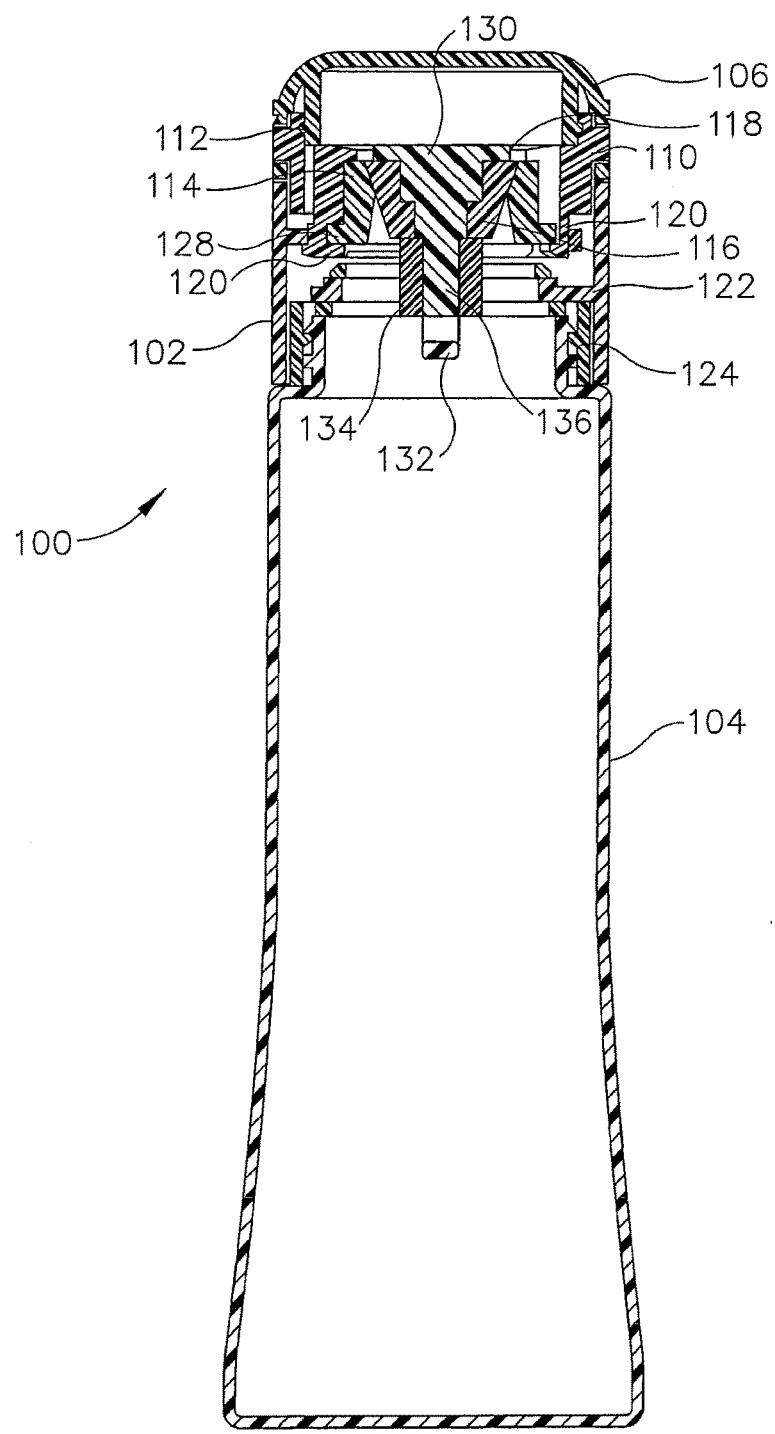
FIG. 3 depicts a side cross sectional view of the grinder of FIG. 1.

FIGS. 1-3 illustrate an exemplary grinder (100). It will be appreciated that grinder (100) may be used generally to grind spices and minerals for use in cooking or the preparation of food dishes. In some versions, grinder (100) may be used to grind, for example, salt or pepper. It will be understood that even though the description below refers to grinder (100) and other versions of grinder being used with "minerals," any suitable material may be ground using grinder (100) as would be apparent to one of ordinary skill in the art in view of the teachings herein. For instance, spices, minerals, herbs, coffees, seeds, or any other suitable material may be ground using grinder (100). Once ground, the ground ingredient leaves grinder (100) to be used in any suitable manner by the user. It will be appreciated that other exemplary ways of using grinder (100) may be used as would be apparent to one ordinary skill in the art in view of the teachings herein. Further details regarding the detailed mechanism for grinding food will be discussed further below.

In an exemplary version shown in FIG. 1, grinder (100) comprises a head (102) and a bottle (104). Bottle (104) has a generally cylindrical shape with a flared bottom. A cap (106) is placed upon head (102) and accordingly may also be removed from head (102) when grinder (100) is ready for use. Cap (106) is operable to keep dirt, dust, debris, and other foreign objects out of head (102) when grinder (100) is not being used. FIG. 2, for example, shows grinder (100) with cap (106) removed. Head (102) is operable generally to grind spices or minerals contained within bottle (104). Details regarding the grinding mechanism will be discussed further below. In the exemplary version, head (102) attaches to bottle (104) via a snap fit, but in other versions, it will be appreciated that head (102) may be attached to bottle (104), through, for example, a screw-fit or friction-fit connection, or any other suitable connection as would be apparent to one of ordinary skill in the art in view of the teachings herein. It will be understood though that once head (102) is attached to bottle (104), head (102) may still be rotated in relation to bottle (104). Head (102) includes a head recess (108) that seats a radial slider ring (110). Radial slider ring (110) may be adjusted by the user to change the coarseness of the grind caused by head (102), which will be discussed in further detail below. Thereafter, generally speaking, grinder (100) may be flipped upside down, head (102) may be rotated in relation to bottle (104), spices within bottle (104) may be ground, and ground spices and/or minerals may leave head (102).

FIG. 3 shows a cross sectional view of grinder (100). As was previously described, cap (106) is operable to snap onto head (102) of grinder (100). In the illustrated version, cap (106) may be attached to head (102) via friction and/or a complementary notched portion (112) operable to secure cap (106) to head (102). Cap (106) in some versions may have a tab that must be removed prior to removing cap (106) from grinder (100) to ensure that grinder (100) has not been tampered with prior to use. Other suitable variations may be used as would be apparent to one of ordinary skill in the art in view of the teachings herein. It will be appreciated that cap (106) is operable to prevent dust or other foreign particles from getting into head (102) or other parts of grinder (100). It will be appreciated that other suitable mechanisms for attaching cap (106) to head (102) may be used as would be apparent to one of ordinary skill in the art in view of the teachings herein. It will further be appreciated that in some versions, cap (106) may be omitted entirely. In addition or in the alternative, a sticker (118) made of foil or any other suitable material may also be used to prevent dust from entering grinder (100) prior to use.

Head (102) comprises a body portion (122) operable to house various portions of grinder (100) as will be discussed in further detail below. Body portion (122) of the exemplary version has a cylindrical shape operable to be grasped by the user during use. While body portion (122) of the illustrated version has a generally smooth, cylindrical shape, body portion (122) may have any suitable shape as would be apparent to one of ordinary skill in the art in view of the teachings herein. For instance, body portion (122) may include a rubberized grip for holding that encircles body portion (122) or at least a part of body portion (122). Furthermore, body portion (122) may also have any other suitable shape including square shapes, elliptical, etc.

Radial slider ring (110) is seated within body portion (122). Body portion (122) of head (102) is attached to bottle (104) through grinder base (124). Body portion (122) is clipped to grinder base (124) such that body portion (122) can rotate in relation to grinder base (124) without detaching from grinder base (124). While seated in body portion (122), radial slider ring (110) is operable to rotate through a plurality of positions. For instance, radial slider ring (110) of the illustrated version may rotate through 4 discrete positions representing different coarseness settings, though any suitable number of positions may be used including more or less positions than 4. Such movement of radial slider ring (110) will be discussed in further detail below with respect to how radial slider ring (110) controls the coarseness of the grind of a mineral or other material to be ground.

Head (102) comprises an inner grinder element (116) and an outer grinder element (114). Inner grinder element (116) is operable generally to rotate in relation to outer grinder element (114) to grind spices and/or minerals therebetween. Outer grinder element (114) is operable to move up or down longitudinally in relation to inner grinder element (116). Inner grinder element (116) and outer grinder element (114) define a grinding space therebetween whereby increasing that space increases the coarseness of the grind and decreasing that space increases the fineness of the grind.

Outer grinder element (114) and inner grinder element (116) are positioned concentrically in relation to one another in the exemplary version. A shaft (130) extends through the center of both the outer grinder element (114) and inner grinder element (116). Shaft (130) has a shape that complements the contour of inner grinder element (116) such that inner grinder element (116) fits snuggly against shaft (130). In the illustrated version, shaft (130) has graduated sides operable to match with the shape of inner grinder element (116) and to prevent shaft (130) from falling through inner grinder element (116), but it will be appreciated that in some versions, shaft (130) may have a cylindrical shape or any suitable shape as would be apparent to one of ordinary skill in the art in view of the teachings herein. Shaft (130) is operable to hold outer grinder element (114) and inner grinder element (116) together while still allowing outer grinder element (114) to move relative to inner grinder element (116). As a result, inner grinder element (116) is able to rotate in relation to outer grinder element (114) to grind a mineral therebetween.

Inner grinder element (116) sits upon a neck sleeve (134), which is shown in the illustrated version as a cylindrical sleeve. It will be understood that neck sleeve (134) may include other suitable shapes as would be apparent to one of ordinary skill in the art in view of the teachings herein. Shaft (130) extends through neck sleeve (134), and as a result, neck sleeve (134) acts as a spacer between inner grinder element (116) and grinder base (124). A bottom portion (136) of shaft (130) is positioned through a neck sleeve (134) and leads to a blunt hook (132). Blunt hook (132) keeps shaft (130) coupled to neck sleeve (134).

Hook (132) is constructed such that shaft (130) cannot be pulled back through neck sleeve (134). In the exemplary version, hook (132) is simply sized to be wider than neck sleeve (134) but any suitable mechanism for preventing hook (132) from sliding back through neck sleeve (134) may be used as would be apparent to one of ordinary skill in the art in view of the teachings herein. In some versions it will be appreciated that hook (132) have other shapes and configurations such as, for example, a split mushroom top shape, etc., or any other suitable shape as would be apparent to one of ordinary skill in the art in view of the teachings herein. It will be appreciated that hook (132) may deform to fit through neck sleeve (134) wherein after hook (132) expands to prevent hook (132) from being pulled back through neck sleeve (134).

Outer grinder element (114) includes an internal annular flange (128) at the bottom of outer grinder element (114). Internal annular flange (128) is coupled with internal body clips (120), which are in contact with radial slider ring (110) within body portion (122). Furthermore, radial slider ring (110) is screwingly coupled with body portion (122) due to radial slider ring (110) riding along angled ramps, such as those shown and discussed below in FIG. 4. As radial slider ring (110) rotates in one direction, for instance, clockwise, then radial slider ring (110) rises axially within body portion (122). As radial slider ring (110) rotates in the opposite direction, radial slider ring (110) descends axially within body portion (122). Since radial slider ring (110) is coupled to annular flange (128) of outer grinder element (114) through internal body clips (120), as radial slider ring (110) rises and descends axially in relation to body portion (122), outer grinder element (114) rises and descends axially as well.

Shaft (130) and inner grinder element (116) remain axially stationary as outer grinder element (114) rises and descends. As a result, as a user turns radial slider ring (110) to raise or lower outer grinder element (114) in relation to body portion (122), outer grinder element (114) accordingly moves axially away from or toward inner grinder element (116). Thus, the user may rotate radial slider ring (110) to control the size of the space between inner grinder element (116) and outer grinder element (114).

For example, if the user desires a coarser grind, then the user rotates radial slider ring (110) in one direction. As a result, radial slider ring (110) screwingly descends in relation to body portion (122), which pushes annular flange (128) and outer grinder element (114) axially downward in relation to inner grinder element (116). The space between inner grinder element (116) and outer grinder element (114) therefore increases. Thereafter, the user can turn bottle (104) over and rotate bottle (104), which causes inner grinder element (116) to rotate in relation to outer grinder element (114), thereby grinding and/or crushing mineral therebetween.

In contrast, if the user desires a finer grind, then the user rotates radial slider in the opposite direction. Radial slider ring (110) then screwingly ascends in relation to body portion (122), which pushes annular flange (128) and outer grinder element (114) axially upwards in relation to inner grinder element (116). The space between inner grinder element (116) and outer grinder element (114) decreases. Thereafter, the user can turn bottle (104) over and rotate bottle (104), which causes inner grinder element (116) to rotate in relation to outer grinder element (114), thereby grinding and/or crushing mineral therebetween, resulting in a finer grind.

II. Alternative Exemplary Grinder

Figure 4:
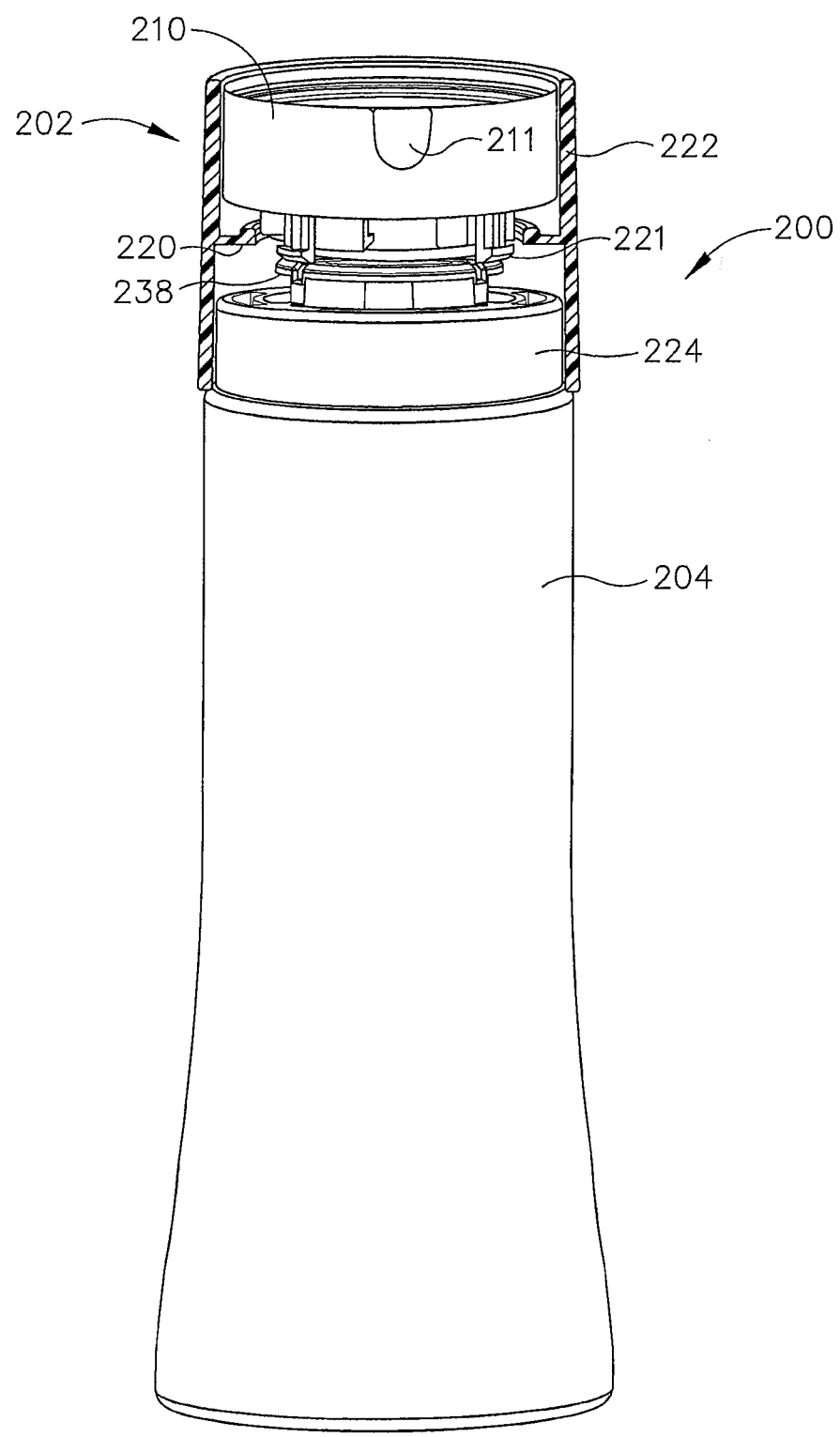
FIG. 4 depicts a side perspective view of an alternative exemplary version of a grinder.

FIG. 4 shows an alternative exemplary version of a grinder (200) having a slightly alternatively designed head (202) positioned upon a bottle (204). Head (202) covers recess (224) of bottle (204) while still being able to rotate around recess (224) when attached to bottle (204). It will be appreciated that grinder (200) of FIG. 4 operates in a substantially similar manner as grinder (100) of FIG. 1. Head (202) includes a body portion (222) and a radial slider ring (210) seated within body portion (222). Radial slider ring (210) has a tab (211) for rotation using a user's finger or thumb to rotate radial slider ring (210) within head (202). Radial slider ring (210) may be used to control the coarseness of the grind of grinder (200).

Radial slider ring (210) in the exemplary version is screwingly coupled to head (202) via clips (221) in contact with angled ramps (220), which encircle the inner portion of head (202). As a result, when radial slider ring (210) is rotated, it ascends or descends based on the direction it is rotated along angled ramp (220). A ring base (238) sits at the bottom of radial slider (210) such that ring base (238) can support neck sleeve (234). A shaft (230) ending in a hook (232) extends through inner grinder element (216) and neck sleeve (234) to hold inner grinder element (216) and neck sleeve (234) together.

As previously mentioned, the coarseness of the grind may be controlled by changing the distance between outer grinder element (214) and inner grinder element (216) where a larger distance between outer grinder element (214) and inner grinder element (216) results in a coarser grind and where a smaller space results in a more fine grind. FIGS. 5A-7B show grinder (200) as it moves through three merely exemplary coarseness settings. While the exemplary version shows three coarseness settings, it will be appreciated that other suitable coarseness settings may be used as well.

In FIGS. 5A-5B, radial slider ring (210) is in a coarse setting position. As can be seen in FIG. 5A, radial slider ring (210) is positioned relatively low within head (202), which corresponds to a coarse setting. Radial slider ring (210) in communication with body portion (222) via angled ramp (220). Radial slider ring (210) and clips (221) hold onto angled ramp (220). Angled ramp (220) extends around head (202) such that as radial slider ring (210) rotates, radial slider ring (210) rides along angled ramp (220) as angled ramp (220) ascends. As radial slider ring (210) rotates in the other direction, radial slider ring (210) rides along angled ramp (220) as angled ramp (220) descends. Furthermore, outer grinder element (214) is coupled to radial slider ring (210). As radial slider ring (210) is rotated, radial slider ring (210) raises and lowers, and outer grinder element (214) raises and lowers while inner grinder element (216) remains axially stationary. For example, in FIGS. 5A-5B, which show a relatively coarse setting, the space between outer grinder element (214) and inner grinder element (216) is approximately 0.95 mm. However, it will be appreciated that such space between inner grinder element (216) and outer grinder element (214) may be any suitable size as will be apparent to one of ordinary skill in the art in view of the teachings herein.

FIGS. 6A-6B depict a medium setting wherein the space between inner grinder element (216) and outer grinder element (214) may have a space of approximately 0.6 mm. As seen in FIG. 6A, radial slider ring (210) is positioned slightly higher within head (202) in comparison to radial slider ring (210)'s position in FIG. 5A, which represents a medium grind setting. By rotating radial slider ring (210), radial slider ring (210) travels along angled ramp (220) such that outer grinder element (214) rises, thereby narrowing the space between outer grinder element (214) and inner grinder element (216) to be in the medium coarseness setting.

Figure 7B:
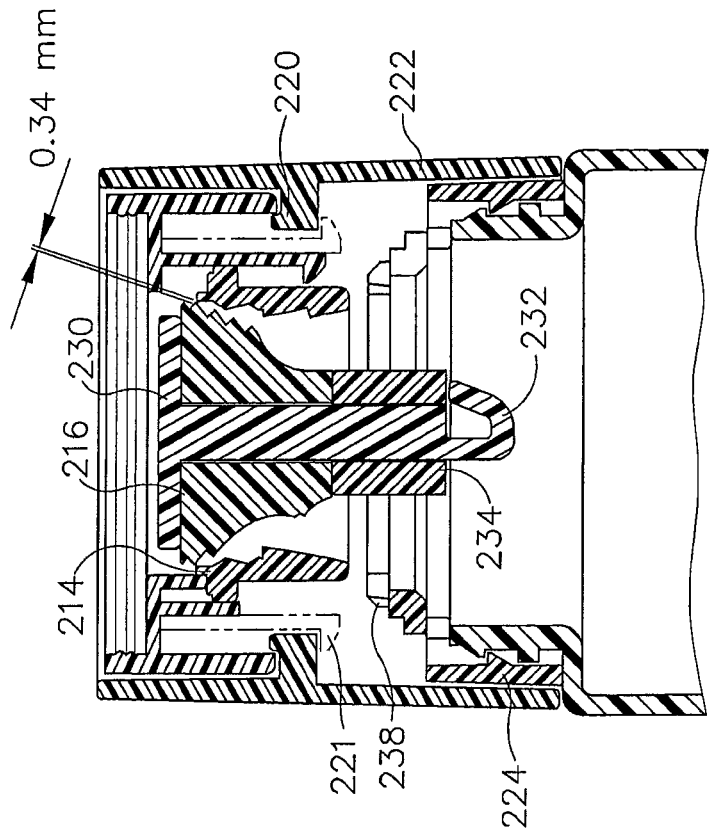
FIG. 7B depicts a side partially cross sectional view of the head shown in FIG. 7A.
Figure 7A:
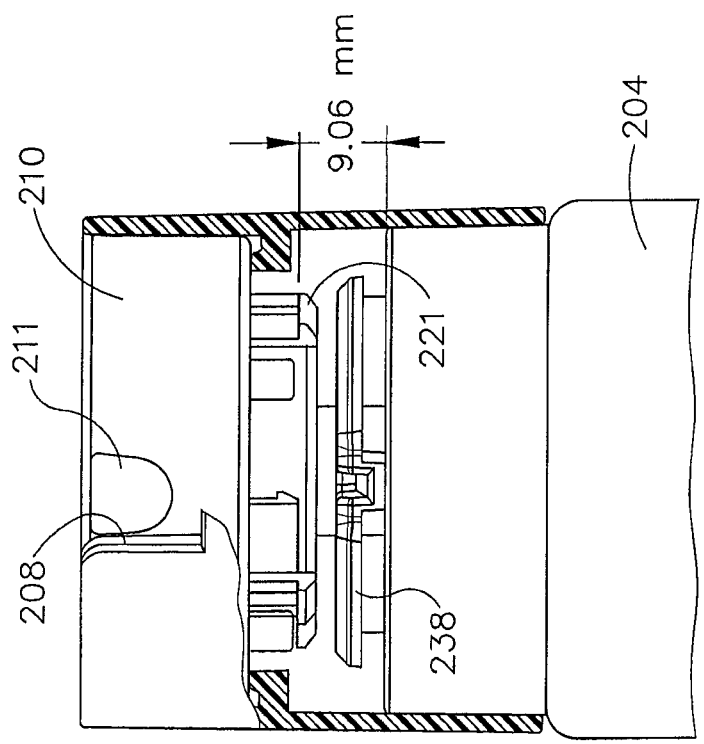
FIG. 7A depicts a side elevation view of the head of the grinder of FIG. 4 in a fine grind setting.
Figure 8:
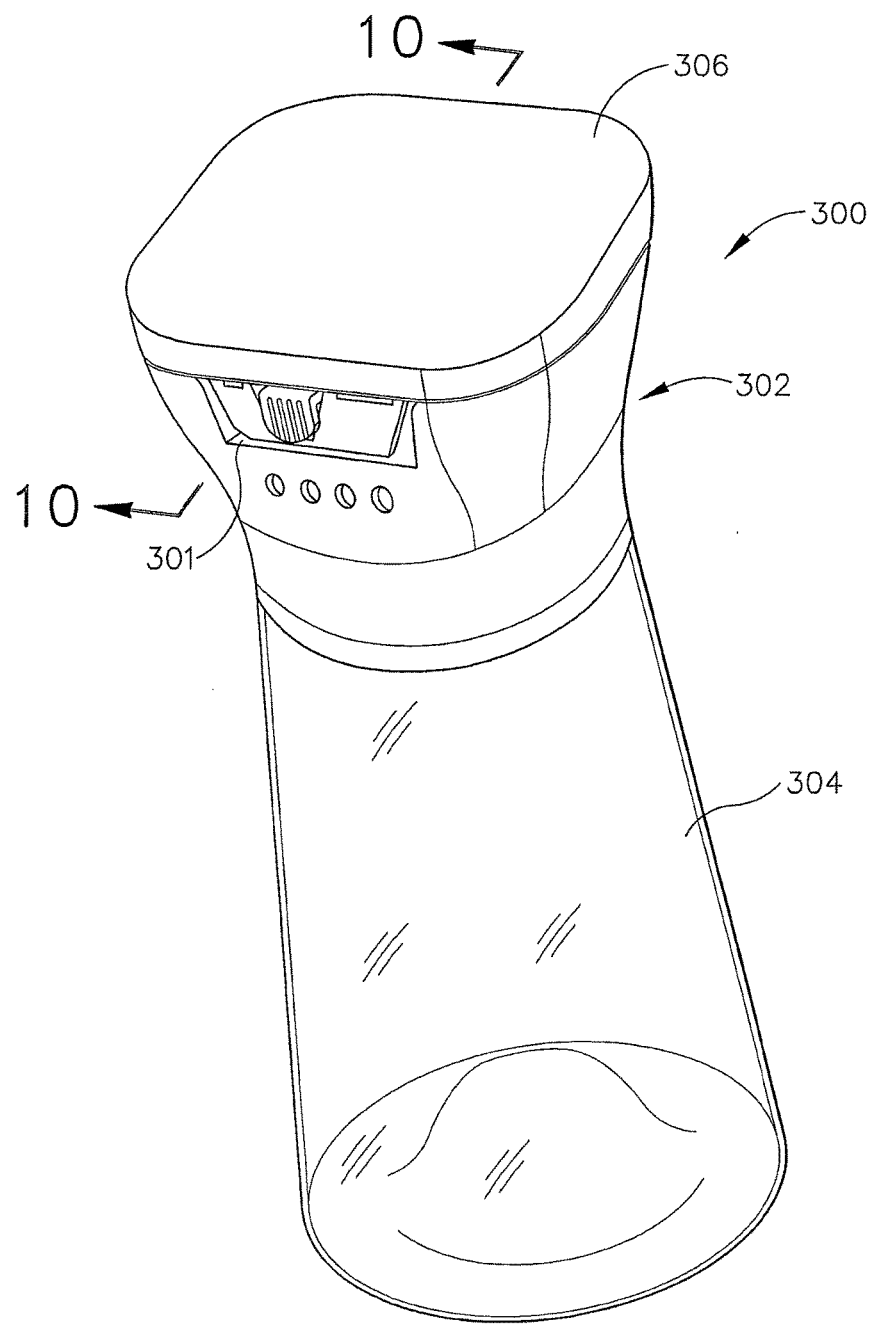
FIG. 8 shows a perspective view of an alternative exemplary version of a grinder.

FIGS. 7A-7B depict a relatively fine setting wherein the space between inner grinder element (216) and outer grinder element (214) may have a space of approximately 0.34 mm. As seen in FIG. 7A, radial slider ring (210) is positioned higher within head (202) in comparison to radial slider ring (210)'s position in FIG. 6A, which represents a fine grind setting. By rotating radial slider ring (210) even more, radial slider ring (210) continues to ascend along angled ramp (220) such that outer grinder element (214) rises further, thereby narrowing the space between outer grinder element (214) and inner grinder element (216) to be in the fine setting.

It will be understood that as radial slider ring (210) is rotated, the space between inner grinder element (216) and outer grinder element (214) gradually changes such that the user may be able to select a coarseness setting in between those shown in FIGS. 5A-7B. In other merely exemplary versions, it will be contemplated that radial slider ring (210) may be set to have discrete settings wherein the user selects between a discrete number of settings to set the coarseness of grinder (200). In some versions, an audible click may signify that a new coarseness setting has been reached. Furthermore, it will be understood that the values depicted representing the space between inner grinder element (216) and outer grinder element (214) are merely exemplary and any suitable spacing between inner grinder element (216) and outer grinder element (214) may be used as would be apparent to one of ordinary skill in the art in view of the teachings herein. Furthermore, any distances indicated between recess (224) and angled ramp (220) are also merely exemplary. It will be understood that one of ordinary skill in the art may use different distances between recess (224) and angled ramp (220) as would be apparent to one of ordinary skill in the art in view of the teachings herein.

III. Alternative Exemplary Grinder

Figure 9:
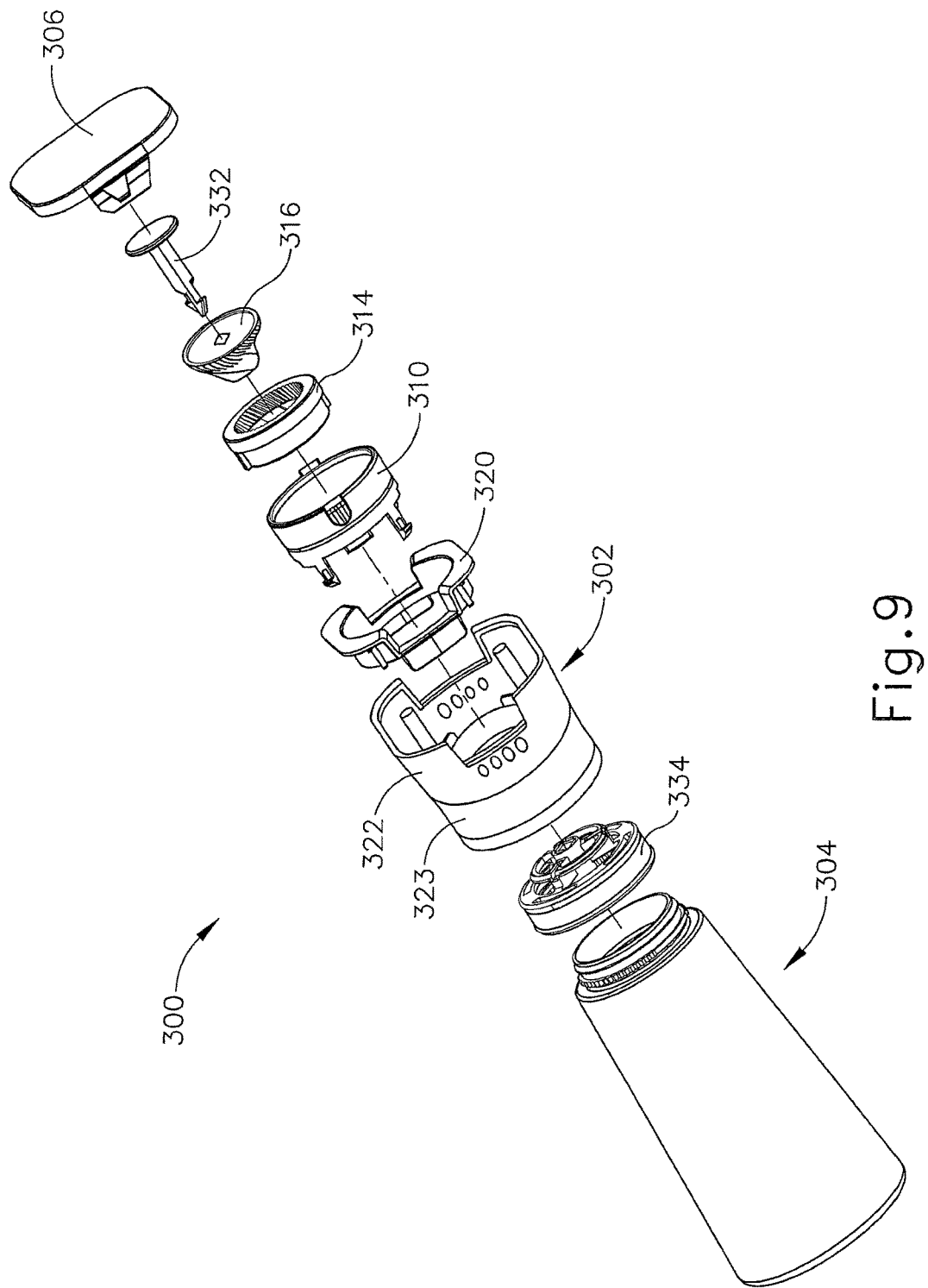
FIG. 9 shows a perspective, exploded view of the grinder of FIG. 8.

FIGS. 8-13 show another exemplary version of a grinder (300) having a head (302) and a bottle (304). FIG. 9 shows an exploded view of grinder (300). Grinder (300) comprises a body portion (322) having a grip (323). Grip (323) of the exemplary version comprises a rubberized ring encircling body portion (322) placed in a slight recess within body portion (322), though it will be appreciated that any suitable grip (323) may be used. Head (302) includes a recess (301), which provides sufficient clearance such that radial slider (310), which will be discussed below, can rotate within head (302). It will further be appreciated that grinder (300) may function in a substantially similar manner as grinder shown in FIG. 4 or FIG. 1.

Figure 10:
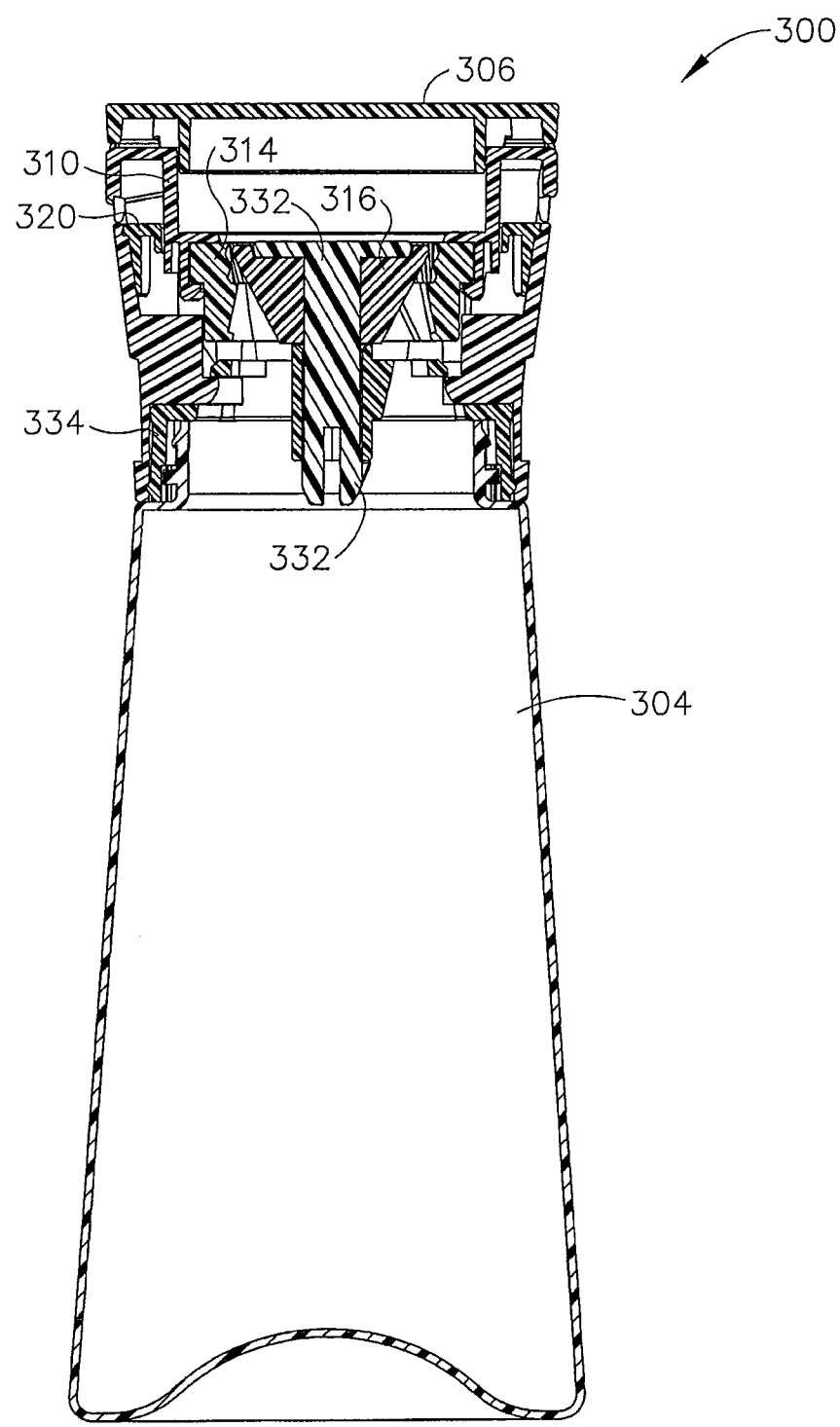
FIG. 10 shows a side cross sectional view of the grinder of FIG. 8.

A cross sectional view shown in FIG. 10 shows grinder (300) in further detail. Grinder (300) further comprises an outer grinder element (314) and an inner grinder element (316) seated within outer grinder element (314). Outer grinder element (314) is coupled with a radial slider (310). Radial slider (310) fits within a connector member (320), which is operable to couple radial slider (310) and body portion (322) together. A cap (306) covers body portion (306) as well as outer grinder element (314) and inner grinder element (316). Furthermore a hook (332) extends through inner and outer grinder elements (316, 314) and through a square shaped neck opening (337) in neck sleeve (334). Neck sleeve (334) fits on bottle (304) via a screw connection, but any suitable connection means may be used.

Figure 11:
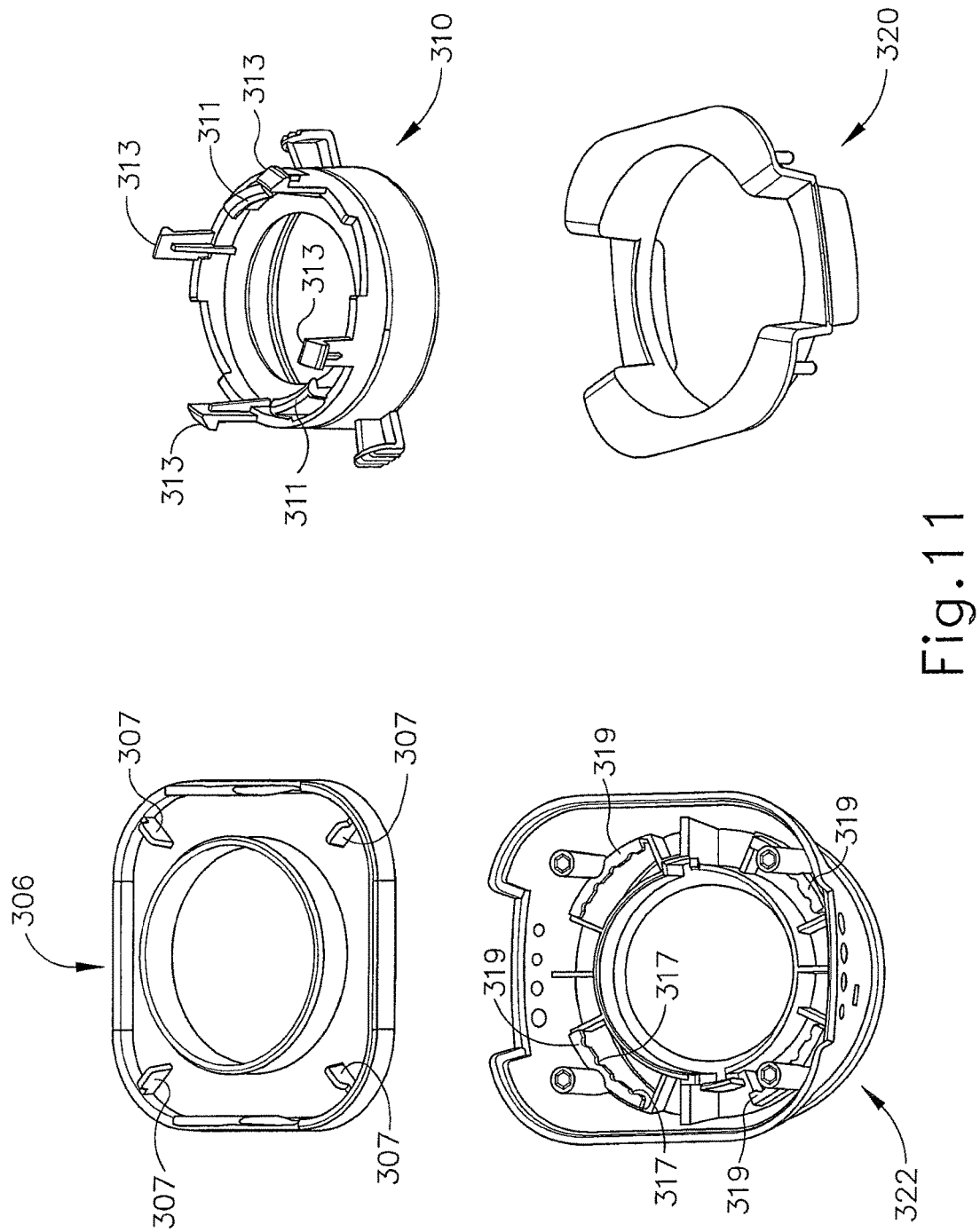
FIG. 11 shows a perspective, disassembled view of a body portion, a cap, a connector portion, and a radial slider of the grinder of FIG. 8.

Turning to FIG. 11, body portion (322) is shown along with cap (306), radial slider (310), and connector member (320). In the exemplary version, cap (306) comprises a plurality of tabs (307) operable to stabilize cap (306) when placed on body portion (322). In the exemplary version, four tabs (307) are used but it will be appreciated that any suitable number of tabs (307) may be used as would be apparent to one of ordinary skill in the art in view of the teachings herein. As can been seen more clearly in FIG. 8, radial slider (310) comprises two opposing clips (311) operable to couple radial slider (310) with neck sleeve (334) shown in FIG. 9. Radial slider (310) also includes clips (313) to couple with angled ramps (319) such that as radial slider (310) rotates, radial slider (310) rises and descends within body portion (322). Angled ramps (319) further include notches (317) able to correspond to various coarseness settings for grinder (300).

Figure 12:
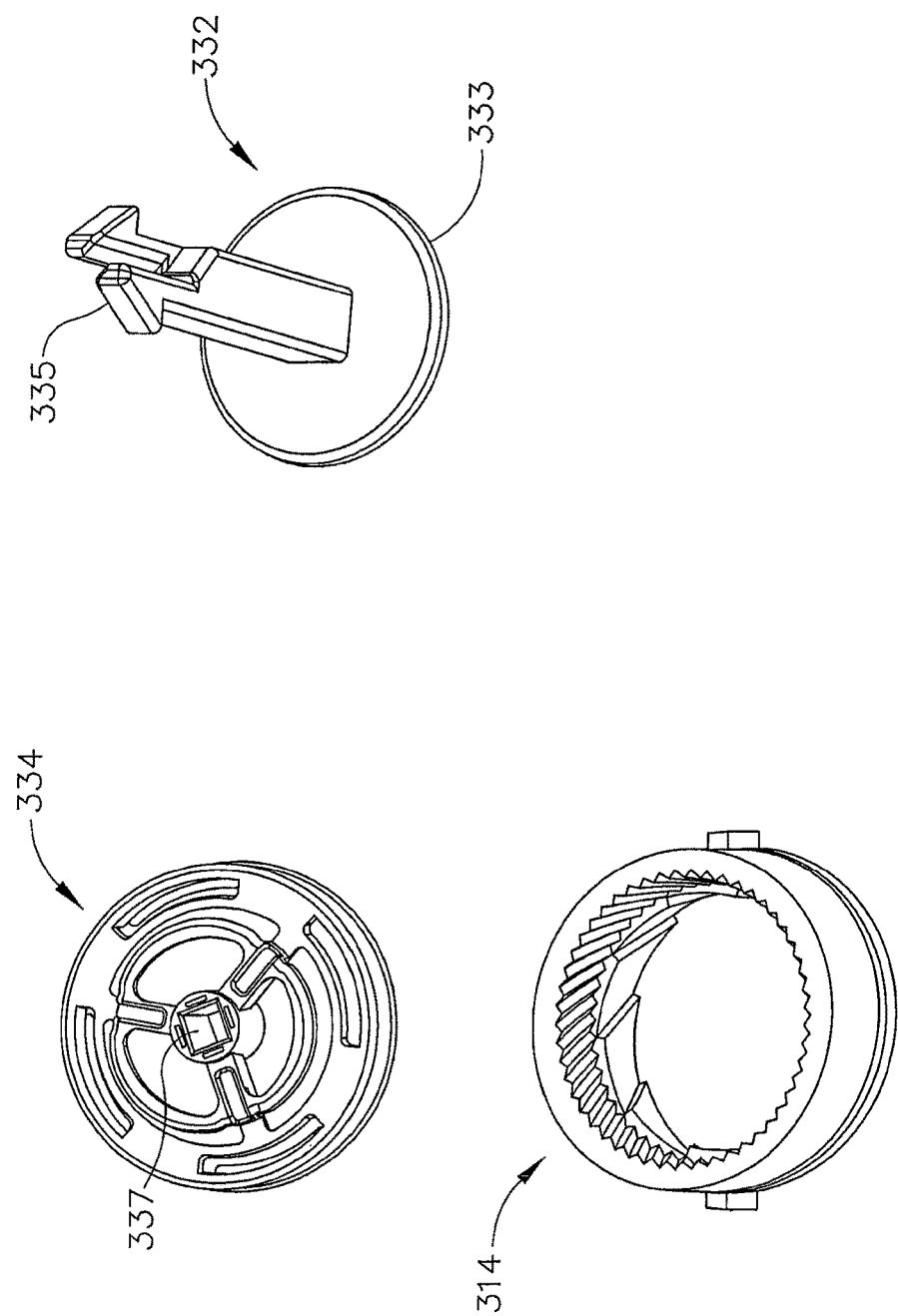
FIG. 12 shows a perspective, disassembled view of a neck sleeve, hook, and outer grinder element of the grinder of FIG. 8.

FIG. 12 shows other exemplary components of grinder (300) including hook (332), outer grinder element (314) and neck sleeve (334). Hook (332) in the exemplary version comprises a base (333) and twin hooking members (335). Hooking members (335) are constructed such that members (335) sit off-center from being coaxially aligned. Furthermore, hooking members (335) are separated as they extend from base (333). While the exemplary version shows two hooking members (335), it will be appreciated that more than two hooking members (335) may be used as would be apparent to one of ordinary skill in the art in view of the teachings herein.

Neck sleeve (334) comprises a square shaped neck (337) operable to fit hook (332). It will be appreciated that neck (337) may be constructed to be any suitable depth as would be apparent to one of ordinary skill in the art in view of the teachings herein. It will be understood that providing neck (337) having additional depth may act to further stabilize hook (332) within neck sleeve (334).

IV. Exemplary Grinder with Seal

It will be appreciated that in some instances, as grinder (300) is being used, finer pieces of ground mineral may result in leaking of ground mineral from grinder (300). Thus, it may be desirable to construct grinder (300) such that grinder (300) is more resilient against leaking from ground material. It will be appreciated that outer grinder element (414) and body portion (422) described below may be used with any of the grinders shown such as grinder (200) shown in FIG. 4 or grinder (300) shown in FIG. 8 to assist in preventing leakage from grinder (200, 300).

Figure 13:
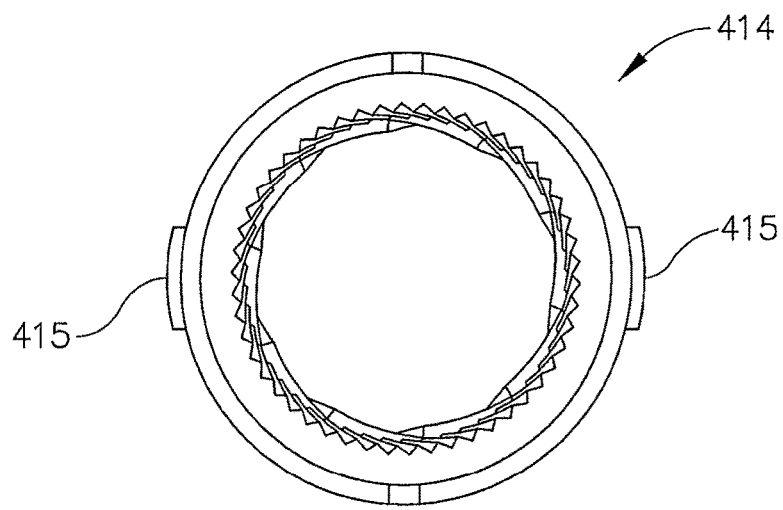
FIG. 13 shows a top, plan view of an alternative version of an outer grinder element.
Figure 14:
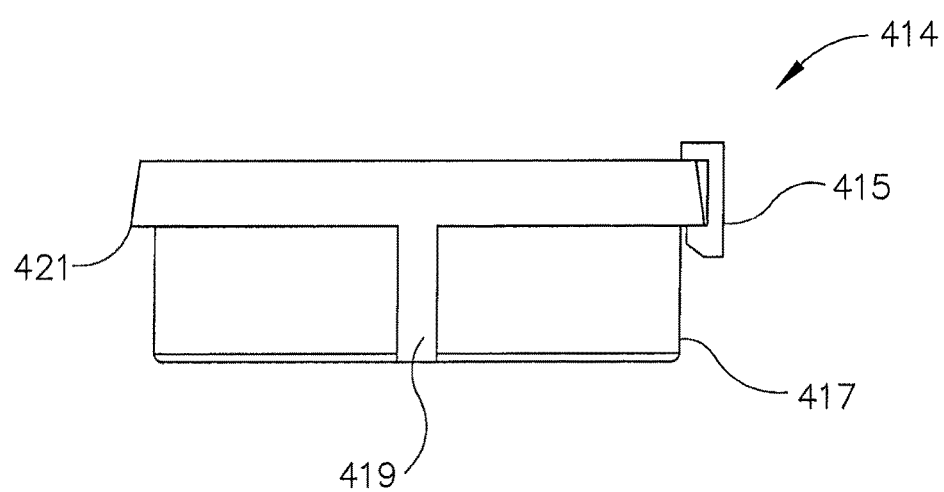
FIG. 14 shows a side, elevation view of an alternative version of the outer grinder element of FIG. 13.

FIGS. 13-14 show an alternative exemplary outer grinder element (414) for use to prevent leaking. Outer grinder element (414) comprises opposing clips (415) gripping a lip (421) that extends around the circumference of outer grinder element (414). Under lip (421) is an inner wall (417), and extending down from lip (421) is a mating portion (419). It will be appreciated that lip (421), mating portion (419) and inner wall (417) may be used to help prevent leakage of ground material. Lip (421), mating portion (419) and inner wall (417) are operable to form a seal with a sealing member, which will be discussed in further detail below.

Figure 15:
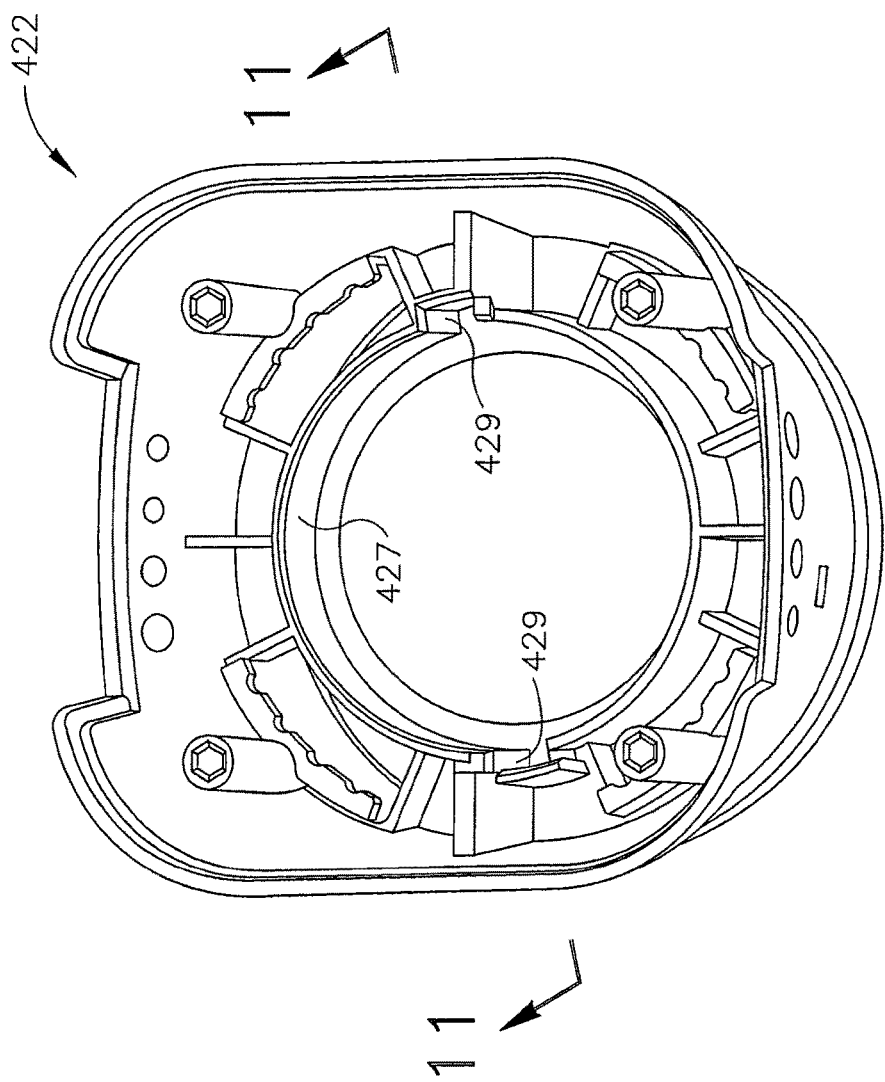
FIG. 15 shows a perspective view of an alternative version of a body portion.
Figure 16:
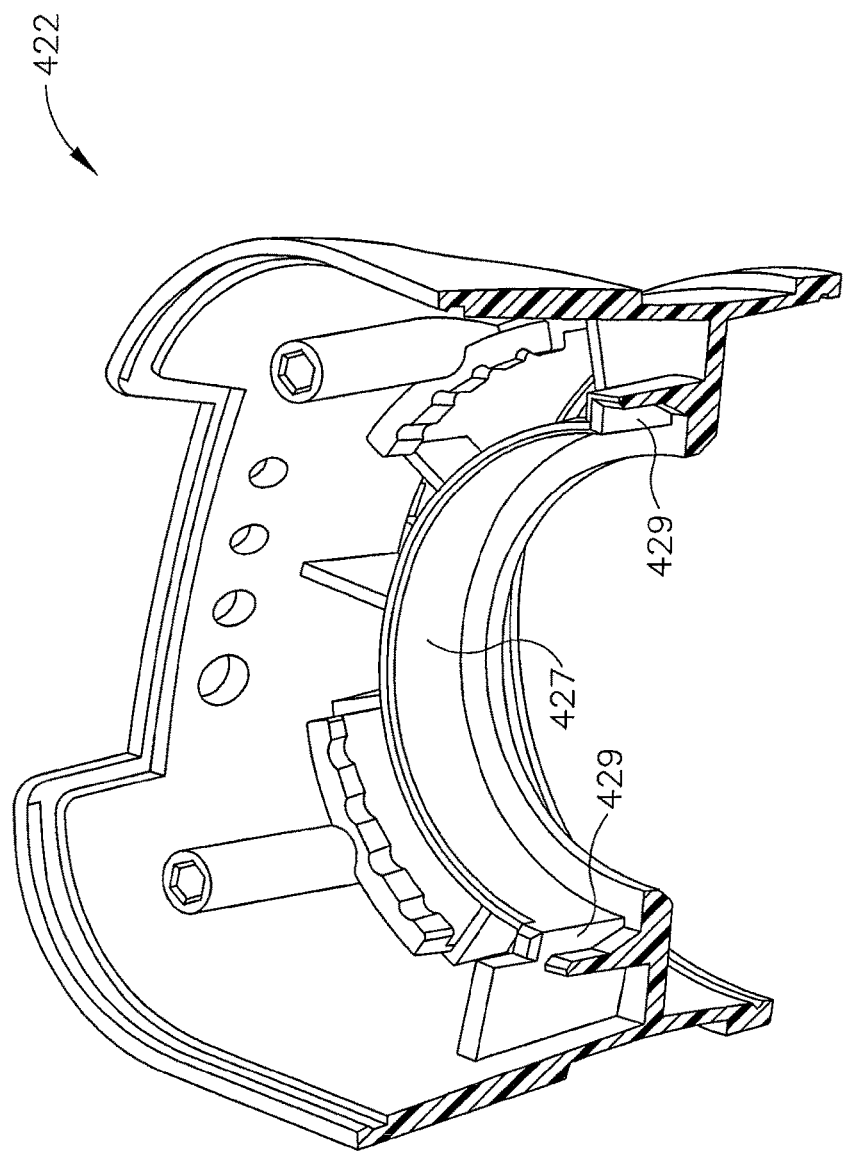
FIG. 16 shows a perspective, cross sectional view of the body portion of FIG. 15.

FIG. 15 shows a perspective view of another exemplary version of a body portion (422) where FIG. 16 shows body portion (422) of FIG. 15 in a cross sectional view. It will be understood that body portion (422) is substantially similar to body portion as shown for instance in FIG. 9. Body portion (422) has a generally circular shape at one end and a rounded square shape at the other. It will be appreciated that other suitable shapes for body portion (422) may be used as would be apparent to one of ordinary skill in the art in view of the teachings herein. In the exemplary version, body portion (422) comprises a pair of recesses (429). In the illustrated version, two recesses (429) are shown that oppose each other, but it will be appreciated that any suitable number of recesses may be used as would be apparent to one of ordinary skill. Furthermore, recesses (429) may be positioned in any suitable fashion within body portion (422). It will be understood that recesses (429) may be used to complement mating portion (419) of outer grinder element (414) shown in FIGS. 13-14, such that as the grinder is being used, recesses (429) provide a better seal with mating portion (419), thereby preventing any leakage of ground material that might otherwise occur. Furthermore, the illustrated version comprises a seal (427) encircling an inner portion of body portion (422). Seal (427) may comprise a rubber, silicon, plastic, or any other suitable material operable to form a seal as will be apparent to one of ordinary skill in the art in view of the teachings herein. It will be understood that seal (427), alone or in conjunction with recesses (429) may provide further sealing with mating portion (419) by complementing inner wall (417) and lip (421) of outer grinder element (414). Seal (427) is also operable to follow the contour of recesses (429), thereby enabling a more secure seal (427). As a result, as a user grinds material with outer grinder element (414), ground material may be less likely to leak due to the seal between inner wall (417) and seal (427).

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art.

For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

We claim:

1. An apparatus comprising:
   (a) a head configured to be attached to a bottle, wherein the head includes a radial slider in contact with an angled ramp and operable to control the coarseness of the grind;
   (b) an inner grinding element;
   (c) an axially movable outer grinding element including a flange coupled to clips of the radial slider such that rotation of the radial slider along the angled ramp causes both the radial slider and the outer grinding element to axially move in unison while maintaining direct contact between the radial slider and the outer grinding element, wherein the outer grinding element and the inner grinding element are configured to rotate relative to one another;
   (d) a shaft extending through the inner grinding element and the outer grinding element, wherein the shaft is configured to couple with the inner grinding element, wherein the shaft comprises a blunt end, the blunt end and the radial slider operable to maintain the axial position of the inner grinding element relative to the axially movable outer grinding element; and
   (e) a neck sleeve, wherein the shaft further extends through the neck sleeve, wherein the neck sleeve is operable to act as a rigid spacer between the inner grinding element and the blunt end.

2. The apparatus of claim 1, further comprising a sealing member encircling the outer grinding member.

3. The apparatus of claim 1, wherein the blunt end is shaped as a hook.

4. The apparatus of claim 1, further comprising a cap configured to be placed onto the head, wherein the cap has a rounded square shape, wherein a portion of the head has a rounded square shape operable to complement the shape of the cap, wherein the cap comprises a plurality of friction tabs operable to secure the cap to the head.

5. The apparatus of claim 1, wherein the radial slider comprises one or more tabs for gripping, wherein the head forms at least one recess operable to receive the one or more tabs, wherein the one or more tabs are operable to move within the at least one recess.

6. The apparatus of claim 1, wherein the at least one angled ramp includes one or more notches to indicate different coarseness settings.

7. The apparatus of claim 1, further comprising a neck sleeve wherein the neck sleeve is configured to couple the inner grinding element to the shaft, wherein the shaft comprises a graduated stepping contour, wherein the inner grinding element is shaped to complement the graduated stepping contour of the shaft.

8. The apparatus of claim 1, wherein the outer grinding element includes a lip and a mating portion operable to mate with a portion of the head, wherein the head further comprises at least one inner recess operable to mate with the mating portion of the outer grinding element.

9. The apparatus of claim 8, wherein the at least one inner recess is shaped to complement a seal positioned between the head and the outer grinding element.

10. The apparatus of claim 1, wherein the outer grinding element is configured to axially move away from the inner grinding element.

11. The apparatus of claim 1, wherein the radial slider is configured to rotate from a first position to a second position.

12. The apparatus of claim 11, wherein the radial slider is coupled with the outer grinding element such that the outer grinding element is configured to move from a first lateral position to a second lateral position.

13. The apparatus of claim 12, wherein the outer grinding element is moved away from the inner grinding element when in the first lateral position and the outer grinding element is moved toward the inner grinding element when in the second lateral position.

* * * * *